United States Patent
Jackson

(10) Patent No.: US 6,957,584 B2
(45) Date of Patent: Oct. 25, 2005

(54) SPAN AND NULL SHIFT TEMPERATURE COMPENSATED THIN FILM STRAIN GAUGE BRIDGE BY SERIES RESISTANCE

(75) Inventor: Andrew John Jackson, Cheltenham (GB)

(73) Assignee: Senstronics Limited, Cheltenham (GB)

( * ) Notice: Subject to any disclaimer, the term of this patent is extended or adjusted under 35 U.S.C. 154(b) by 15 days.

(21) Appl. No.: 10/450,516

(22) PCT Filed: Dec. 14, 2001

(86) PCT No.: PCT/GB01/05548
§ 371 (c)(1),
(2), (4) Date: Oct. 21, 2003

(87) PCT Pub. No.: WO02/48669
PCT Pub. Date: Jun. 20, 2002

(65) Prior Publication Data
US 2004/0093955 A1 May 20, 2004

(30) Foreign Application Priority Data
Dec. 16, 2000 (GB) .............................. 0030797

(51) Int. Cl.⁷ ................................................ G01B 7/16
(52) U.S. Cl. ...................................................... 73/765
(58) Field of Search ........................... 73/765, 862.622, 73/862.623

(56) References Cited

U.S. PATENT DOCUMENTS

| | | | |
|---|---|---|---|
| 3,245,252 A | 4/1966 | First et al. | |
| 4,172,389 A | * 10/1979 | Branch | 73/766 |
| 4,173,148 A | * 11/1979 | Yamada et al. | 73/766 |
| 4,299,130 A | 11/1981 | Koneval | |
| 4,432,247 A | * 2/1984 | Takeno et al. | 73/862.623 |
| 4,480,478 A | * 11/1984 | Sato et al. | 73/708 |
| 4,510,813 A | 4/1985 | Kanazawa | |
| 4,658,651 A | 4/1987 | Le | |
| 4,747,456 A | 5/1988 | Kitagawa et al. | |
| 4,777,826 A | 10/1988 | Rud, Jr. et al. | |
| 4,788,521 A | 11/1988 | Johnson | |
| 4,911,016 A | * 3/1990 | Miyazaki et al. | 73/766 |
| 5,253,532 A | * 10/1993 | Kamens | 73/708 |
| 5,805,028 A | * 9/1998 | Kato | 331/116 R |

* cited by examiner

Primary Examiner—Max Noori
(74) Attorney, Agent, or Firm—Young & Thompson

(57) ABSTRACT

A temperature compensated strain gauge assembly comprises a strain gauge (10) having two or more resistor or piezoresistors (Rb) in half bridge or full bridge configuration and one or more temperatures compensating resistors or piezoresistors (Rc) connected in series with the bridge resistors or piezoresistors. The resistance of the temperature compensating resistor(s) or piezoresistor(s) is such that, as temperature changes, the compensating resistor(s) or piezoresistor(s) compensates for a change in span of the strain gauge so that, for a given load applied to the substrate, the span of the strain gauge will remain constant or substantially constant and compensate(s) the null shift of the strain gauge when the bridge resistors or piezoresistors are such as to provide a known offset at a given temperature.

6 Claims, 1 Drawing Sheet

SPAN AND NULL SHIFT TEMPERATURE COMPENSATED THIN FILM STRAIN GAUGE BRIDGE BY SERIES RESISTANCE

BACKGROUND OF THE INVENTION

The present invention relates to a temperature compensated strain gauge assembly and to a method of temperature compensating a strain gauge.

DESCRIPTION OF THE RELATED ART

The use of strain gauges to monitor small deflections is common and widespread. One particular application is in a pressure sensor. Strain gauges typically take the form of resistive or piezoresistive devices, particularly resistive devices comprising either four resistors in full-bridge configuration or two resistors in half-bridge configuration.

A problem occurs in that, once the gauge has been applied to a substrate, a temperature span error will tend to result particularly but not necessarily solely because the modulus of elasticity of the substrate changes with change in temperature resulting in an increased or decreased deflection of the substrate for a given load applied thereto and a change thus in the output of the strain gauge. The term "temperature span error" as used herein means the change in span of the strain gauge due to temperature alone.

It is to be understood that the term "load" as used herein includes strain, stress, force or pressure. Also, it is to be understood that the term "substrate" as used herein includes a single substrate or stack (series) of different substrates.

Also a temperature offset error tends to result because of a null shift which resides in the gauge itself. The null shift is due to the fact that the resistors are inherently unable to "track", that is to say, are unable to change at precisely the same rate as each other as temperature changes. This is a known defect and one which cannot easily, if at all, be entirely compensated for during manufacture. The term "null shift" as used herein means the change in the bridge offset due to temperature alone.

SUMMARY OF THE INVENTION

According to a second aspect of the present invention, there is provided a method of temperature compensating a strain gauge, the method comprising the steps of:

(a) depositing or otherwise applying a strain gauge having two or more resistors or piezoresistors in half-bridge or full-bridge configuration in series with nore or more temperature compensating resistors or piezoresistors onto or into a substrate, (b) trimming or tuning one or more of the bridge or temperature compensating resistors so that, as temperature changes, the or each compensating resistor or piezoresistor compensate for a change in span of the strain gauge so that, for a given load (as defined herein) applied to the substrate, the span of the strain gauge will remain substantially constant, and (c) trimming or tuning one or more of the bridge resistors or piezoresistors to provide a known offset at a given temperature so that the or each compensating resistor or piezoresistor also acts to cancel or substantially cancel the null shift of the bridge.

According to a second aspect of the present invention, there is provided a method of temperature compensating a strain gauge, the method comprising the steps of:

(a) depositing or otherwise applying a strain gauge having two or more resistors or piezoresistors in half-bridge or full-bridge configuration in series with nore or more temperature compensating resistors or piezoresistors onto or into a substrate, (b) trimming or tuning one or more of the bridge or temperature compensating resistors so that, as temperature changes, the or each compensating resistor or piezoresistor compensate for a change in span of the strain gauge so that, for a given load (as defined herein) applied to the substrate, the span of the strain gauge will remain substantially constant, and (c) trimming or tuning one or more of the bridge resistors or piezoresistors to provide a known offset at a given temperature so that the or each compensating resistor or piezoresistor also acts to cancel or substantially cancel the null shift of the bridge.

BRIEF DESCRIPTION OF THE DRAWINGS

The invention will now be more particularly described by way of example with reference to the accompanying drawings, wherein.

DESCRIPTION OF THE PREFERRED EMBODIMENTS

Figure 1:
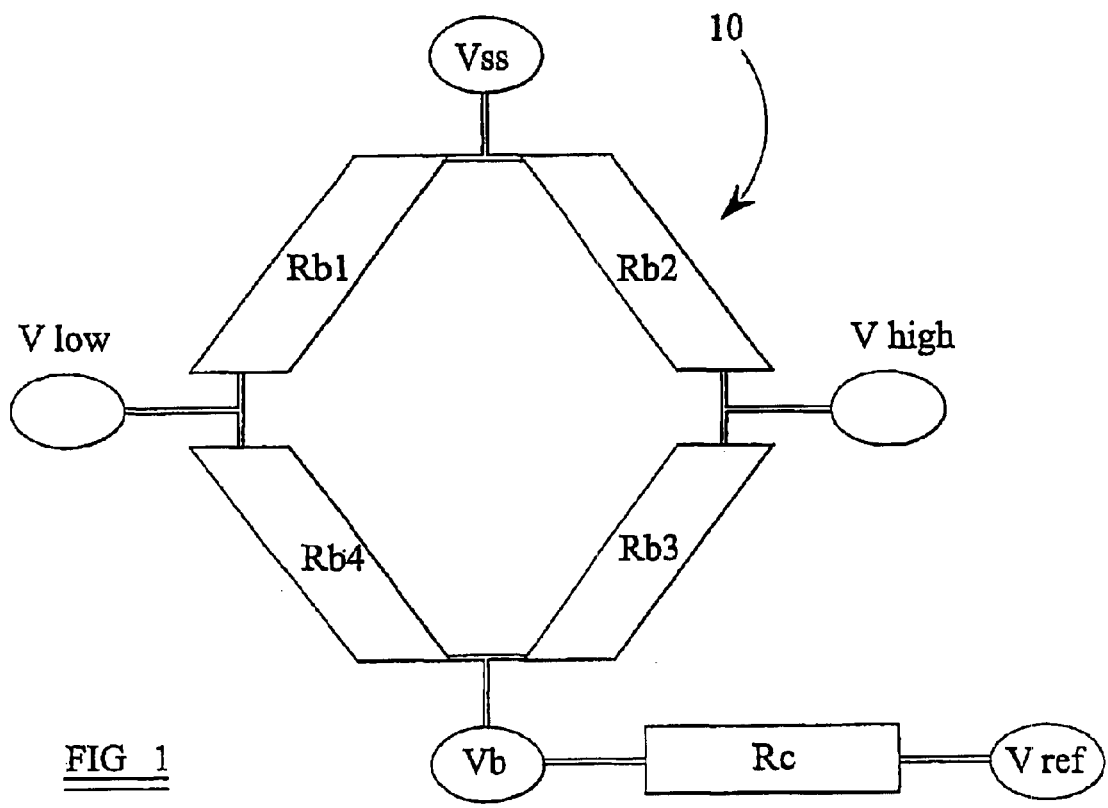
FIG. 1 is a circuit diagram of one embodiment of a strain gauge assembly according to the present invention.

Referring firstly to FIG. 1 of the drawings, there is shown therein a strain gauge assembly comprising a strain gauge 10 made up of four resistors Rb1, Rb2, Rb3, Rb4 arranged in a full-bridge configuration and a temperature compensating resistor Rc, the resistance of which varies much more significantly with temperature than the resistance of the resistors Rb1, Rb2, Rb3 or Rb4. The resistors Rb and Rc are in the form of thin-film resistors which are typically vacuum deposited onto a substrate.

Terminals Vss, Vlow, Vhigh, Vb and Vref are also typically vacuum deposited onto the substrate.

The substrate may be in the form of a diaphragm of a pressure sensor. The resistors Rb1 and Rb3 are configured so that as the pressure on the diaphragm increases, the resistance of each of these resistors increases and resistors Rb2 and Rb4 are configured so that as the pressure on the diaphragm increases, the resistance of each of these resistors decreases.

A constant supply voltage is connected to terminal Vss and a reference voltage is connected to terminal Vref. The output voltage of the bridge is taken between terminals Vhigh and Vlow and the difference between the voltages at these terminals is measured.

Temperature span error is minimised when the bridge voltage, Vb, a function of Rc and Rb and their relative TCR's is set to an optimal value. At this optimal value, the bridge voltage increases at the same rate that the substrate modulus increases thereby keeping the span constant as temperature changes. The resistor Rc is selected to give an optimal or substantially optimum bridge voltage. The output voltage of the strain gauge 10, namely the difference between the voltage at terminal Vhigh and terminal Vlow, will thus remain substantially constant for a given pressure applied to the diaphragm regardless of temperature. The resistor Rc and/or one or more of the resistors Rb1, Rb2, Rb3 and Rb4 can be trimmed or tuned after deposition to reduce the temperature span error even further.

Figure 2:
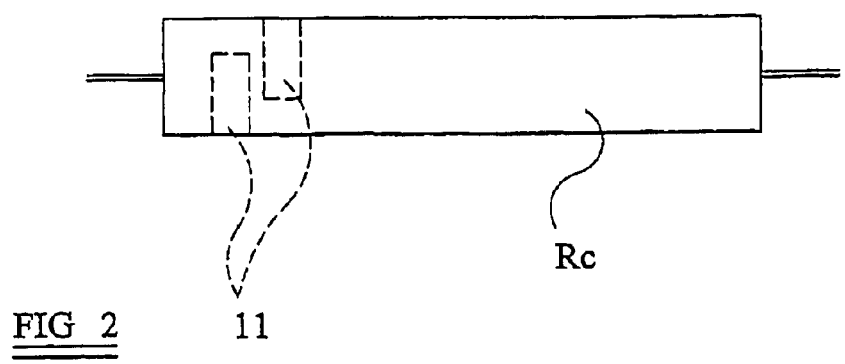
FIG. 2 is a schematic view showing how the resistance of the resistors of FIG. 1 can be varied.

The resistance of a resistor R is given by the following formula:

$$R = \frac{\rho L}{wt}$$

where:
ρ=resistivity
L=length of the resistor
w=width of the resistor
t=thickness of the resistor The resistance of a resistor can therefore be varied by changing the length of the resistor. This can be done, for example, as shown in FIG. 2, by removing portions 11 of the resistor Rc to increase its length. Alternatively, the resistance could be varied by changing the width of the resistor.

Once the temperature span error has been reduced to a minimal value one or more of the bridge resistors Rb1, Rb2, Rb3 or Rb4 is/are trimmed to provide a known offset at, say, room temperature. The compensating resistor then changes this offset value with temperature in order that it cancels or substantially cancels the null shift.

For the avoidance of doubt, the connection parts between configured portions of the resistors form part of the resistors and these connection parts could be trimmed instead of the configured portions.

The embodiment described above is given in respect of a resistive strain gauge in full-bridge configuration. However, the strain gauge could comprise just two resistors in half-bridge configuration. Also, there could be two temperature compensating resistors, one between terminal Vss and the bridge 10 and the other between terminal Vb and Vref. The bridge and/or the compensating resistor(s) could be piezoresistive and in this case they are typically diffused into the substrate.

What is claimed is:

1. A temperature compensated strain gauge assembly comprising a strain gauge having two or more resistors or piezoresistors in half-bridge or full-bridge configuration and one or more temperature compensating resistors or piezoresistors connected in series with the bridge resistors or piezoresistors, the resistance of the temperature compensating resistor(s) or piezoresistor(s) being such that, as temperature changes, the or each compensating resistor or piezoresistor acts to:

(a) compensate for a change in span of the strain gauge so that, for a given load (as defined herein) applied to the substrate, the span of the stain gauge will remain constant or substantially constant; and (b) compensate the null shift of the strain gauge when the resistance value(s) of the bridge resistor(s) or piezoresistor(s) are such as to provide a known offset at a given temperature.

2. A temperature compensated strain gauge assembly as claimed in claim 1, wherein the bridge resistors or piezoresistors and the temperature compensating resistor(s) or piezoresistor(s) are thin-film resistors or diffused piezoresistors.

3. A temperature compensated strain gauge assembly as claimed in claim 1, wherein the substrate is a diaphragm of a pressure sensor.

4. A method of temperature compensating a strain gauge, the method comprising the steps of:

a) depositing or otherwise applying a strain gauge having two or more resistors or piezoresistors in half-bridge or full-bridge configuration in series with one or more temperature compensating resistors or piezoresistors onto or into a substrate, b) trimming or tuning one or more of the bridge or temperature compensating resistors or piezoresistors so that, as temperature changes, the or each compensating resistor or piezoresistor compensates for a change in span of the strain gauge so that, for a given load (as defined herein) applied to the substrate, the span of the strain gauge will remain substantially constant, and c) trimming only the resistance value of one or more of the bridge resistors or piezoresistors specifically to provide a known offset at a given temperature so that the or each compensating resistor or piezoresistor also acts to cancel or substantially cancel the null shift of the bridge.

5. A method as claimed in claim 4, wherein the bridge and temperature compensating resistors are thin-film resistors and wherein the resistors are trimmed by varying the length and/or width of the resistors.

6. A temperature compensated strain gauge assembly as claimed in claim 2, wherein the substrate is a diaphragm of a pressure sensor.

* * * * *